US009586574B2

United States Patent
Nissato

(10) Patent No.: US 9,586,574 B2
(45) Date of Patent: Mar. 7, 2017

(54) CONTROL APPARATUS FOR HYBRID ELECTRIC VEHICLE

(75) Inventor: Yukihiro Nissato, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 13/606,960

(22) Filed: Sep. 7, 2012

(65) Prior Publication Data

US 2013/0066498 A1    Mar. 14, 2013

(30) Foreign Application Priority Data

Sep. 8, 2011   (JP) ................................ 2011-195631

(51) Int. Cl.
  *B60W 10/06* (2006.01)
  *B60W 10/26* (2006.01)
  *B60W 10/08* (2006.01)

(52) U.S. Cl.
  CPC ........... *B60W 10/26* (2013.01); *B60W 10/06* (2013.01); *B60W 10/08* (2013.01); *B60L 2240/545* (2013.01); *B60W 2510/246* (2013.01); *Y02T 10/6286* (2013.01); *Y02T 10/7005* (2013.01); *Y02T 10/705* (2013.01)

(58) Field of Classification Search
  CPC ............ B60C 23/0472; B60C 23/0484; B60C 23/0477; Y02T 10/7077
  USPC ......................................... 701/22
  See application file for complete search history.

(56) References Cited

U.S. PATENT DOCUMENTS

| 5,886,527 A | 3/1999 | Ito |
| 6,214,625 B1 | 4/2001 | Li et al. |
| 6,215,198 B1 | 4/2001 | Inada et al. |
| 2002/0062183 A1* | 5/2002 | Yamaguchi .............. B60K 6/46 701/22 |
| 2002/0147530 A1* | 10/2002 | Tamagawa et al. ........... 701/22 |
| 2003/0130772 A1* | 7/2003 | Yanagida et al. ............... 701/22 |
| 2004/0076872 A1* | 4/2004 | Kinoshita et al. ............. 429/61 |

(Continued)

FOREIGN PATENT DOCUMENTS

| CN | 1182482 A | 5/1998 |
| DE | 10 2009 057 174 A1 | 6/2011 |

(Continued)

OTHER PUBLICATIONS

Japanese Office Action issued Jul. 23, 2014 in corresponding JP Application No. 2011-195631 with English Translation.

(Continued)

*Primary Examiner* — Michael McCullough
*Assistant Examiner* — Michael E Butler
(74) *Attorney, Agent, or Firm* — Birch, Stewart, Kolasch & Birch, LLP

(57) ABSTRACT

A control apparatus for a hybrid electric vehicle, includes: a temperature detector configured to detect a temperature of the battery; a temperature increase rate calculator configured to calculate, based on the detected temperature of the battery, a temperature increase rate that is an amount of increase in the temperature per unit time; and an engine controller configured to allow, when the temperature increase rate is equal to or higher than a threshold value, the engine to be started, so that the generator generates the electric power. The threshold value is set so that the higher the detected battery temperature, the lower the threshold value.

2 Claims, 7 Drawing Sheets

(56) References Cited

U.S. PATENT DOCUMENTS

| | | |
|---|---|---|
| 2004/0084002 A1* | 5/2004 | Mitsutani et al. ......... 123/179.4 |
| 2006/0048982 A1* | 3/2006 | Yamamoto ............... B60K 6/44 |
| | | 180/65.225 |
| 2007/0108936 A1* | 5/2007 | Yaguchi ....................... 318/800 |
| 2007/0210769 A1* | 9/2007 | Tsutsumi et al. ............. 323/269 |
| 2007/0220883 A1* | 9/2007 | Harada et al. .................. 60/597 |
| 2007/0233334 A1 | 10/2007 | Kozarekar |
| 2007/0272186 A1* | 11/2007 | Fukushima ........... B60W 10/06 |
| | | 123/179.3 |
| 2008/0183348 A1 | 7/2008 | Arita et al. |
| 2009/0030595 A1* | 1/2009 | Sugai ............................ 701/112 |
| 2009/0133859 A1* | 5/2009 | Suzuki et al. ................. 165/121 |
| 2009/0143189 A1* | 6/2009 | Hasegawa et al. ................ 477/5 |
| 2009/0248204 A1* | 10/2009 | Kikuchi et al. ............... 700/275 |
| 2010/0019718 A1* | 1/2010 | Salasoo et al. ............... 320/103 |
| 2010/0106351 A1* | 4/2010 | Hanssen et al. ................ 701/22 |
| 2010/0114413 A1* | 5/2010 | Ichikawa ............... B60K 6/445 |
| | | 701/22 |
| 2010/0153038 A1* | 6/2010 | Tomura ............. G01R 31/3624 |
| | | 702/63 |
| 2010/0241308 A1* | 9/2010 | Kikuchi et al. ................ 701/36 |
| 2010/0268438 A1* | 10/2010 | Hiranuma et al. ............ 701/102 |
| 2011/0066310 A1 | 3/2011 | Sakai et al. |
| 2011/0147106 A1* | 6/2011 | Wenger et al. .......... 180/65.245 |
| 2013/0030623 A1* | 1/2013 | Thiamtong et al. ............. 701/22 |
| 2013/0066498 A1* | 3/2013 | Nissato ........................... 701/22 |
| 2013/0293200 A1* | 11/2013 | Obata .................... H02J 7/0021 |
| | | 320/134 |
| 2013/0311061 A1* | 11/2013 | Ando ............................ 701/102 |
| 2016/0178703 A1* | 6/2016 | Hwang ............... G01R 31/3648 |
| | | 702/63 |

FOREIGN PATENT DOCUMENTS

| | | |
|---|---|---|
| JP | 10-14296 A | 1/1998 |
| JP | 11-18203 A | 1/1999 |
| JP | 3707206 B2 | 10/2005 |
| JP | 2011-62014 A | 3/2011 |

OTHER PUBLICATIONS

Chinese Office Action issued Aug. 20, 2014 in corresponding Chinese Application No. 201210330817.6 with an English translation.

Japanese Office Action issued Dec. 16, 2014 in corresponding Japanese Application No. 2011-195631 with an English translation.

Extended European Search Report of Application No. 12183561.5 dated Nov. 29, 2016.

* cited by examiner

CONTROL APPARATUS FOR HYBRID ELECTRIC VEHICLE

BACKGROUND OF THE INVENTION

The present invention relates to control apparatuses for hybrid electric vehicles.

Examples of known hybrid electric vehicles include one in which an electric current is supplied to a motor from each of a battery and a generator driven by an engine, and a driving wheel is driven by driving torque outputted from the motor.

In such a hybrid electric vehicle, when an electric current is continuously supplied to a motor from a battery, the temperature of the battery is increased. There is apprehension that an excessive increase in battery temperature will cause degradation of the battery. To cope with this, when the battery temperature is equal to or higher than a preset threshold temperature, the electric current supplied to the motor from the battery is suppressed (or motor torque is suppressed), thereby suppressing an increase in battery temperature.

However, such torque suppression affects traveling performance of a vehicle, and thus has room for improvement.

Further, as a technique for preventing battery degradation, there is proposed a technique (related art) in which a depth of discharge of a battery is calculated based on the temperature of the battery, and when the rate of increase in battery temperature is high, a generator is activated in a state where the depth of discharge is low (see Japanese Patent No. 3707206).

However, in the above related art, an engine is started to activate the generator in the state where the depth of discharge is low; thus, although an increase in battery temperature can be suppressed, there is apprehension that the engine might be uselessly started, thereby reducing fuel efficiency.

SUMMARY

This invention provides a control apparatus for a hybrid electric vehicle, which is advantageous in suppressing battery degradation caused by an excessive increase in battery temperature, while suppressing a reduction in fuel efficiency.

An aspect of the invention provides a control apparatus for a hybrid electric vehicle comprising: an electric motor configured to drive a driving wheel of the hybrid electric vehicle; a battery configured to supply an electric current to the electric motor; a generator configured to supply an electric current to the electric motor; and an engine configured to allow the generator to generate electric power, the control apparatus comprising: a temperature detector configured to detect a temperature of the battery; a temperature increase rate calculator configured to calculate, based on the detected temperature of the battery, a temperature increase rate that is an amount of increase in the temperature per unit time; and an engine controller configured to allow, when the temperature increase rate is equal to or higher than a threshold value, the engine to be started, so that the generator generates the electric power, wherein the threshold value is set so that the higher the detected battery temperature, the lower the threshold value.

The engine controller may control the engine so that the higher the temperature increase rate, the larger an electric power generation amount of the generator.

The engine controller may allow start of the engine when the detected temperature of the battery is equal to or higher than a preset first temperature, and disallow start of the engine when the detected temperature of the battery is lower the first temperature.

The engine controller may stop the engine when a period during which the detected temperature of the battery is continuously lower than a second preset temperature after start of the engine is equal to or longer than a preset period.

DETAILED DESCRIPTION OF EMBODIMENTS

Hereinafter, an embodiment of the present invention will be described with reference to the drawings.

Figure 1:
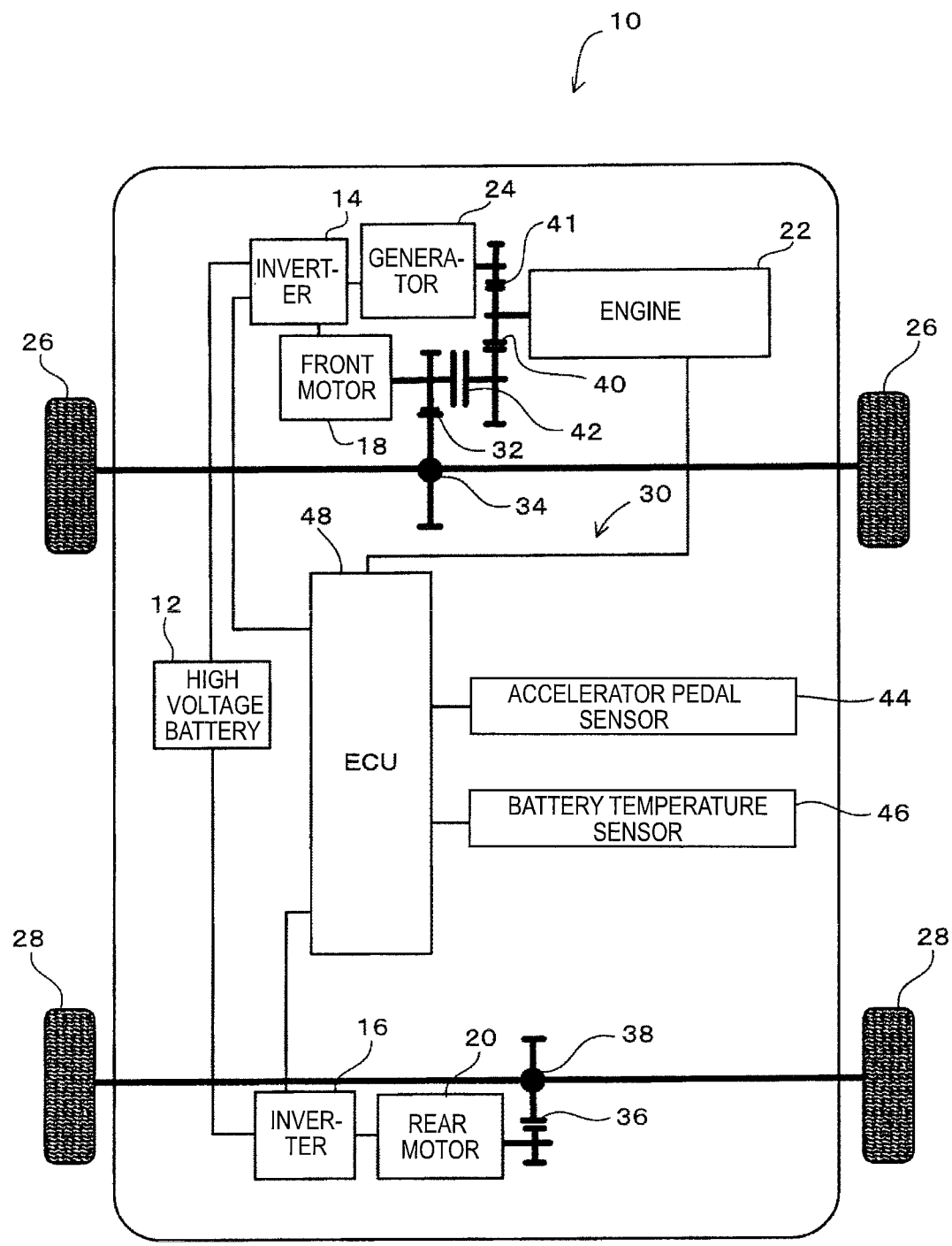
FIG. 1 is a block diagram illustrating an overall configuration of a vehicle 10 on which a control apparatus 30 according to an embodiment of the present invention is installed.

As illustrated in FIG. 1, the vehicle 10 includes: a high voltage battery 12; inverters 14 and 16; a front motor 18 serving as an electric motor; a rear motor 20 serving as an electric motor; an engine 22 serving as an internal combustion engine; a generator 24; front wheels 26; rear wheels 28; and a control apparatus 30 according to the present invention.

Accordingly, the vehicle 10 constitutes a hybrid electric vehicle on which the motors 18 and 20 and the engine 22 are installed.

The high voltage battery 12 supplies electric power to the front and rear motors 18 and 20. Further, an electric current, supplied from the high voltage battery 12 to the front and rear motors 18 and 20, will herein be referred to as a "battery current".

The high voltage battery 12 is charged with electric power supplied from, for example, a domestic commercial power supply or a quick-charging power supply of a charging station via unillustrated charging equipment.

Continuous supply of electric current to the motor(s) causes a gradual increase in temperature of the high voltage battery 12 as a chemical change inside the battery proceeds. When a situation in which the temperature of the battery is excessively increased continues, degradation of the battery might occur. Note that when the battery temperature becomes equal to or higher than a preset temperature, the high voltage battery 12 is forcedly cooled by an unillustrated cooling fan; however, even when the high voltage battery 12 is forcedly cooled by the cooling fan, it is inevitable that the battery temperature will be excessively increased depending on level of the battery current, time period during which the battery current is supplied, and environmental temperature.

The inverters 14 and 16 convert DC electric power, supplied from the high voltage battery 12, into three-phase AC electric power, and supply the three-phase AC electric power to the front and rear motors 18 and 20, respectively.

Based on control performed by an ECU 48 described later, the three-phase AC electric power, which is supplied to the front and rear motors 18 and 20, is controlled by the inverters 14 and 16 by using PWM (pulse width modulation), for example, thereby controlling driving torque outputted from the front and rear motors 18 and 20.

The front motor 18 is driven and rotated by the AC electric power supplied from the inverter 14, and provides power (driving torque) to the front wheels 26 via a speed reducer 32 and a differential gear 34, thereby driving the front wheels 26.

The rear motor 20 is driven and rotated by the three-phase AC electric power supplied from the inverter 16, and provides power (driving torque) to the rear wheels 28 via a speed reducer 36 and a differential gear 38, thereby driving the rear wheels 28.

Furthermore, when regenerative braking of the vehicle 10 is performed, the front and rear motors 18 and 20 each function as a generator, and three-phase AC electric power generated by the front and rear motors 18 and 20 is converted into DC electric power via the inverters 14 and 16; then, the high voltage battery 12 is charged with the DC electric power.

The motors 18 and 20 each incorporate a motor coil, and are each driven and rotated by an electric current (battery current) flowing through its motor coil.

The motors 18 and 20 have characteristics that simultaneously with start of supply of an electric current, a transient large electric current, which is called a "rush current", temporarily flows through the motors 18 and 20.

The lower the motor coil temperature, the larger the rush current, and the higher the motor coil temperature, the smaller the rush current.

The engine 22 is connected to the speed reducer 32 via a speed reducer 40 and a clutch 42. Engagement and disengagement of the clutch 42 is controlled by the ECU.

When the clutch 42 is in a disengaged state, the engine 22 provides power to the generator 24 via a speed reducer 41 and thus drives the generator 24.

The generator 24 generates electric power by the power supplied from the engine 22, and charges the high voltage battery 12 via the inverter 14.

Note that in a state where the battery current is supplied to the front motor 18 (and/or the rear motor 20) from the high voltage battery 12 and thus the front motor 18 (and/or the rear motor 20) are/is driven, the engine 22 is started to allow the generator 24 to generate electric power; then, the electric power (electric current) generated by the generator 24 is supplied to the front motor 18 (and/or the rear motor 20), and in addition, the high voltage battery 12 is charged with electric power (electric current) that has not been consumed by driving of the front motor 18 (and/or the rear motor 20). In other words, the electric current supplied from the generator 24 is added to the battery current supplied from the high voltage battery 12, and the resulting electric current is supplied to the front motor 18 and/or the rear motor 20.

Moreover, for the sake of simplification, the following description will be made on a case where the vehicle 10 travels by using only the front motor 18. However, the present invention is also naturally applicable to a case where the vehicle 10 travels by using only the rear motor 20, or a case where the vehicle 10 travels by using both of the front and rear motors 18 and 20.

Note that the present embodiment will be described on the assumption that when the clutch 42 is in the disengaged state, the engine 22 provides power to the generator 24 via the speed reducer 41 and thus drives the generator 24.

However, the present invention is also naturally applicable to a case where when the clutch 42 is in the engaged state, the engine 22 provides power to the generator 24 via the speed reducer 41 and thus drives the generator 24, while the engine 22 provides power (driving torque) to the front wheels 26 via the speed reducer 40, the clutch 42, the speed reducer 32 and the differential gear 34 and thus drives the front wheels 26.

The control apparatus 30 includes: an accelerator pedal sensor 44; a battery temperature sensor 46; and the ECU 48.

The accelerator pedal sensor 44 detects an accelerator pedal pressing amount, and supplies the detected value to the ECU 48.

The battery temperature sensor 46 detects a temperature of the high voltage battery 12 (which will hereinafter be referred to as a "battery temperature TB"), and supplies the detected value to the ECU 48. In the present embodiment, the battery temperature sensor 46 constitutes a "temperature detector".

The ECU 48 includes: a CPU; a ROM for storing/retaining a control program or the like; a RAM serving as an area where the control program is operated; and an interface section serving as an interface between the ECU 48 and a peripheral circuit or the like.

Figure 2:
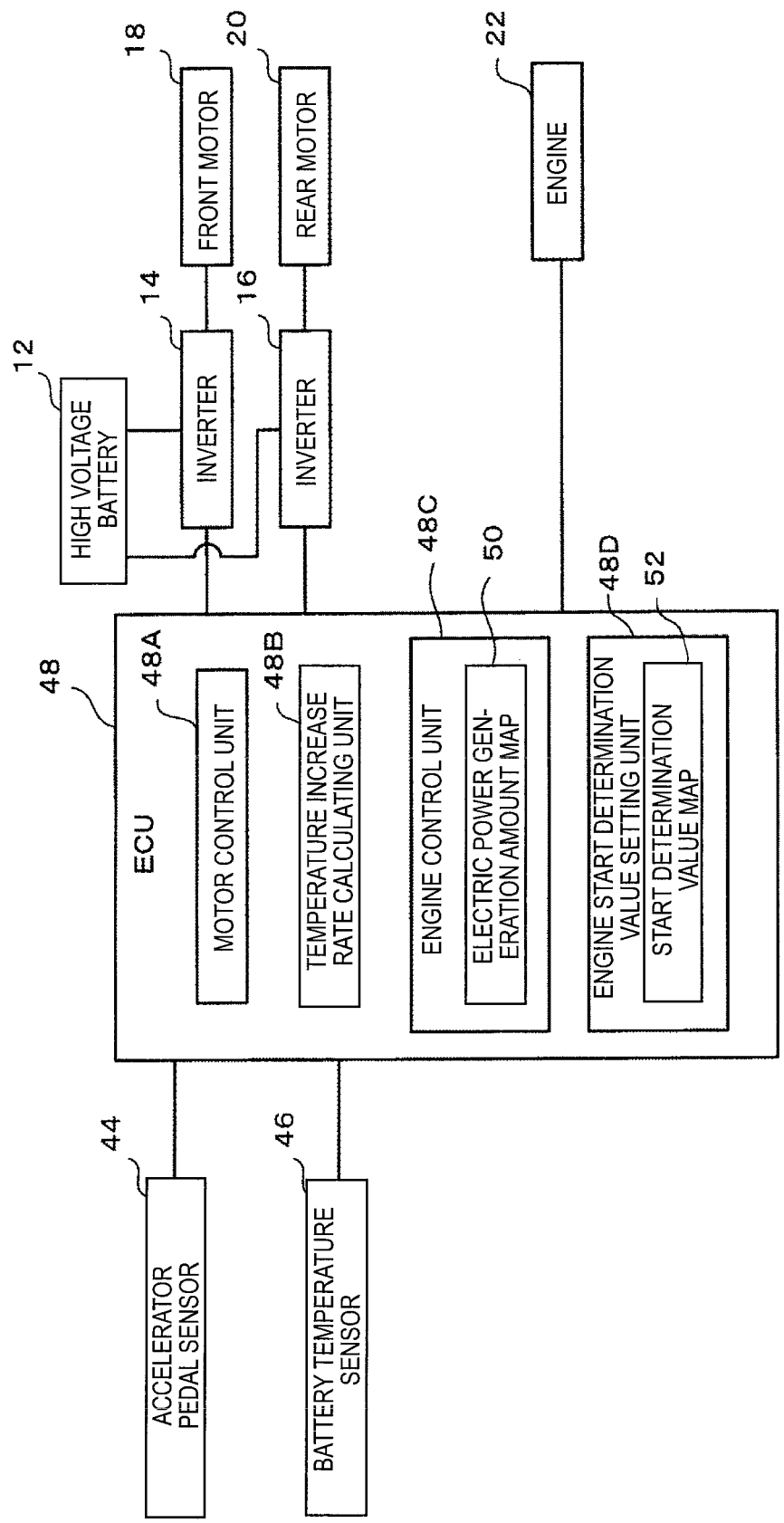
FIG. 2 is a functional block diagram illustrating a configuration of the control apparatus 30.

As illustrated in FIG. 2, the ECU 48 executes the control program, thereby implementing: a motor control unit 48A; a temperature increase rate calculating unit 48B; an engine control unit 48C; and an engine start determination value setting unit 48D. Note that in the present embodiment, the engine control unit 48C and the engine start determination value setting unit 48D constitute an "engine controller".

The motor control unit 48A controls the electric current, supplied to the front motor 18 from the high voltage battery 12, in accordance with the accelerator pedal pressing amount detected by the accelerator pedal sensor 44, i.e., in accordance with the required driving torque.

The temperature increase rate calculating unit 48B calculates, based on the battery temperature TB detected by the battery temperature sensor 46, a temperature increase rate $\alpha$ that is an amount of increase in the battery temperature TB per unit time.

Figure 3:
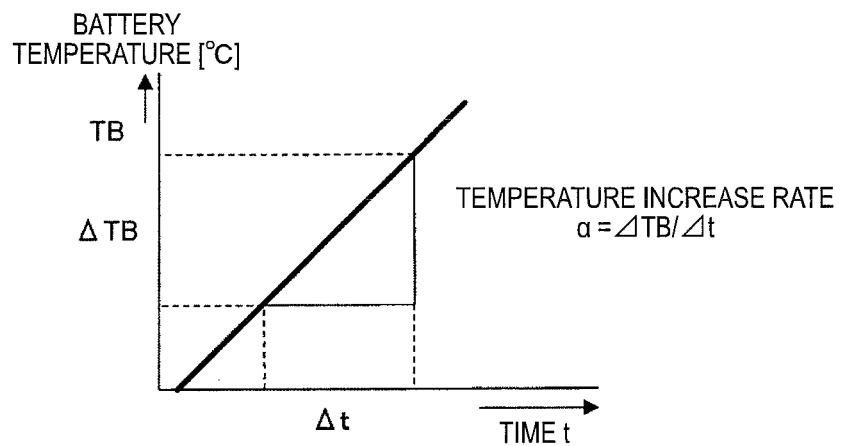
FIG. 3 is an explanatory graph of a temperature increase rate α.

Specifically, as illustrated in FIG. 3, when the amount of increase in the battery temperature TB per unit time $\Delta t$ is $\Delta TB$, the temperature increase rate $\alpha$ is defined by $\Delta TB/\Delta t$.

The engine control unit 48C controls, for example, the start, stop and RPM of the engine 22. When the temperature increase rate $\alpha$ calculated by the temperature increase rate calculating unit 48B is equal to or higher than an engine start determination value $\alpha 1$ that is a preset threshold value, the engine control unit 48C starts the engine 22, thereby activating the generator 24.

In the present embodiment, the engine control unit 48C controls the engine 22 so that the higher the temperature increase rate $\alpha$, the larger the electric power generation amount of the generator 24 will be. In other words, the engine control unit 48C controls the engine 22 so that the higher the temperature increase rate α, the higher the RPM of the engine 22 will be.

In the present embodiment, the engine control unit 48C includes an electric power generation amount map 50.

Figure 4:
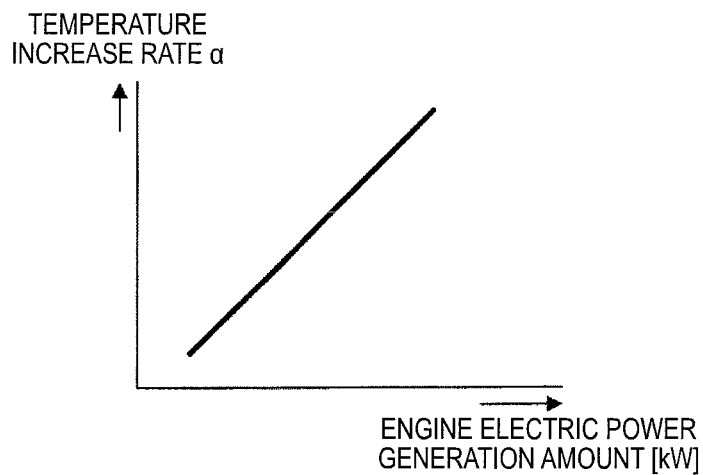
FIG. 4 is an explanatory graph of an electric power generation amount map 50 illustrating a relationship between the temperature increase rate α and electric power generation amount P (kW).

As illustrated in FIG. 4, the electric power generation amount map 50 is a map illustrating a relationship between the temperature increase rate α and electric power generation amount P (kW).

The engine control unit 48C identifies the electric power generation amount P from the temperature increase rate a based on the electric power generation amount map 50, and controls the RPM of the engine 22 (or controls driving of the engine 22) so that the electric power generation amount P is generated by the generator 24.

Further, when the battery temperature TB detected by the battery temperature sensor 46 is equal to or higher than a first threshold temperature TB1 (which is a first given temperature set in advance), the engine control unit 48C allows the start of the engine 22; on the other hand, when the detected battery temperature TB is below the first threshold temperature TB1, the engine control unit 48C disallows the start of the engine 22.

The first threshold temperature TB1 is set as a temperature at which no consideration has to be given to degradation of the high voltage battery 12 because even if a pronounced temperature increase has occurred, the battery temperature TB is originally low as long as the battery temperature TB is below the first threshold temperature TB1. The first threshold temperature TB1 is set at room temperature) (25°), for example.

Furthermore, the engine control unit 48C stops the engine 22 upon satisfaction of an engine stop requirement after the start of the engine 22.

In the present embodiment, the engine stop requirement is that a period during which the battery temperature TB detected by the battery temperature sensor 46 is continuously below a second threshold temperature TB2 (which is a second given temperature set in advance) must be equal to or longer than a threshold period (which is a given period set in advance). The second threshold temperature TB2 is set as a temperature that allows degradation of the high voltage battery 12 to be ignored as long as the battery temperature TB is below the second threshold temperature TB2. Note that the engine stop requirement is not limited to this example but any requirement may be set.

The engine start determination value setting unit 48D sets the engine start determination value α1 so that the higher the battery temperature TB detected by the battery temperature sensor 46, the lower the engine start determination value α1 will be.

Figure 5:
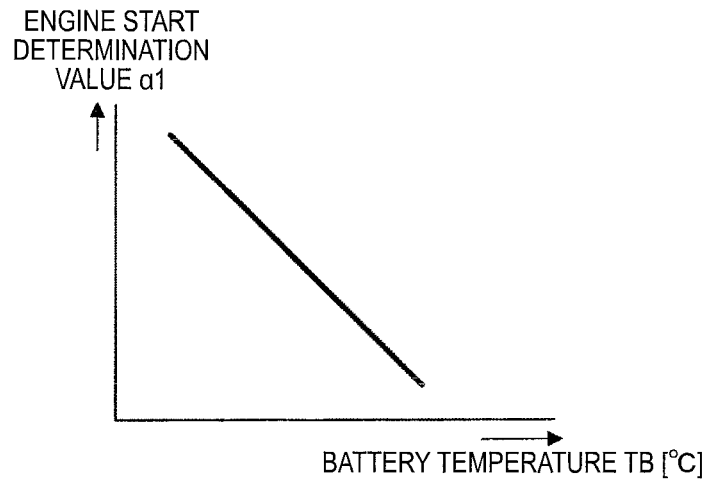
FIG. 5 is an explanatory graph of a start determination value map 52 illustrating a relationship between a battery temperature TB and an engine start determination value α1.

In the present embodiment, the engine start determination value setting unit 48D includes a start determination value map 52. As illustrated in FIG. 5, the start determination value map 52 is a map illustrating a relationship between the battery temperature TB and the engine start determination value α1.

The engine start determination value setting unit 48D identifies and sets the engine start determination value α1 from the battery temperature TB based on the start determination value map 52.

Next, referring to a flow chart of FIG. 6, operations of the controller 30 will be described.

Figure 6:
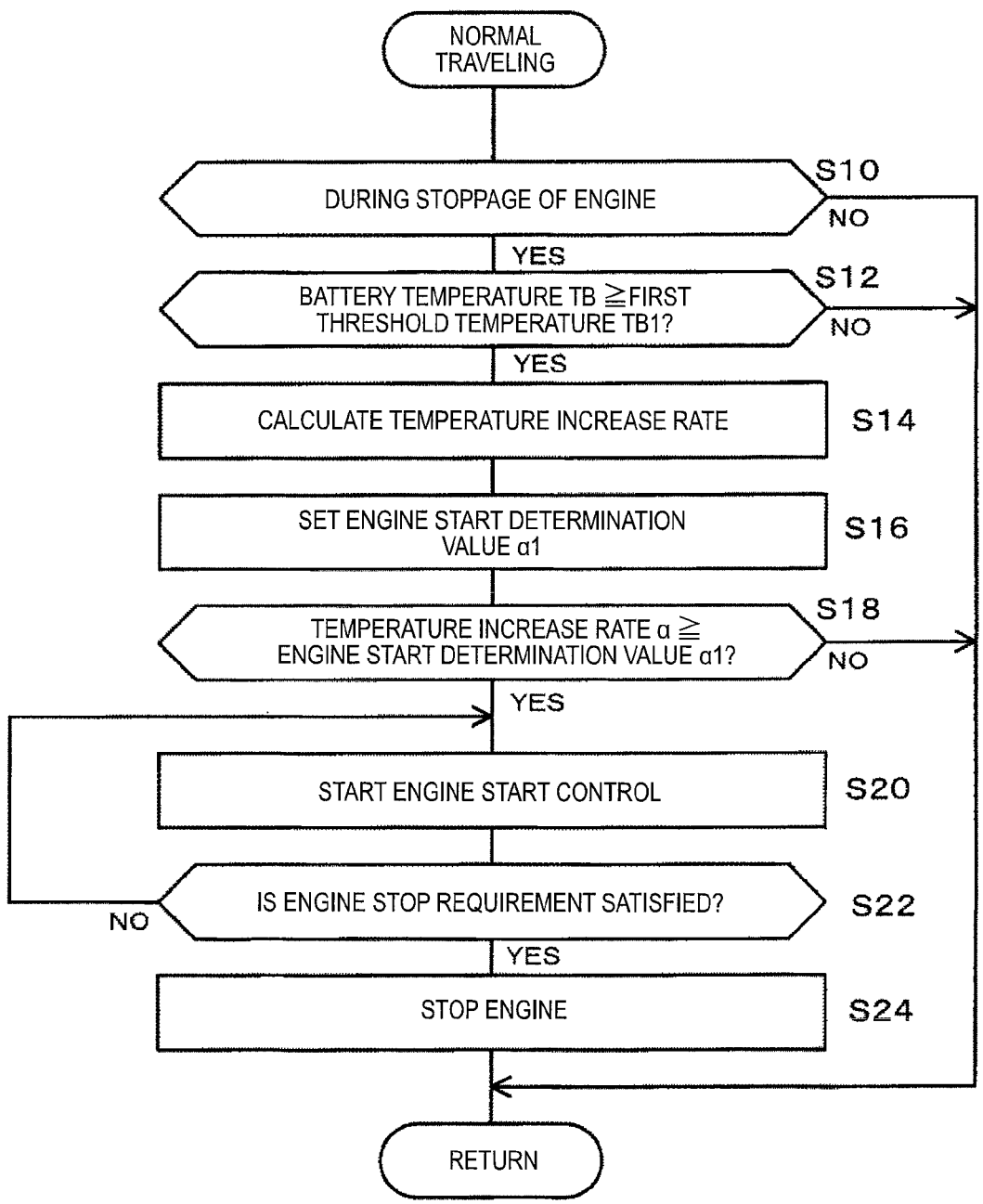
FIG. 6 is a flow chart illustrating operations of the control apparatus 30.

Processing illustrated in FIG. 6 is carried out repeatedly when normal traveling of the vehicle 10 is performed by using the motor 18 with the engine 22 stopped.

First, the ECU 48 determines whether or not the engine 22 is stopped (Step S10).

When the answer is NO in Step S10, the ECU 48 skips the subsequent processes and returns the processing.

When the answer is YES in Step S10, the ECU 48 determines whether or not the battery temperature TB detected by the battery temperature sensor 46 is equal to or higher than the first threshold temperature TB1 (Step S12).

When the answer is NO in Step S12, the ECU 48 skips the subsequent processes and returns the processing. When the answer is YES in Step S12, the ECU 48 (temperature increase rate calculating unit 48B) calculates the temperature increase rate α (Step S14). Specifically, the start of the engine 22 is disallowed when the battery temperature TB is below the first threshold temperature TB1, and the start of the engine 22 is allowed when the battery temperature TB is equal to or higher than the first threshold temperature TB1.

Subsequently, the ECU 48 (engine start determination value setting unit 48D) identifies and sets the engine start determination value α1 from the battery temperature TB based on the start determination value map 52 (Step S16).

Then, the ECU 48 (engine control unit 48C) determines whether or not the temperature increase rate α is equal to or higher than the engine start determination value α1 (Step S18).

When the answer is No in Step S18, the ECU 48 skips the subsequent processes and returns the processing.

When the answer is YES in Step S18, the ECU 48 (engine control unit 48C) starts engine start control (Step S20). Specifically, the ECU 48 identifies the electric power generation amount P from the temperature increase rate α based on the electric power generation amount map 50, and controls the RPM of the engine 22 so that the electric power generation amount P is generated by the generator 24.

Subsequently, the ECU 48 (engine control unit 48C) determines whether or not the period during which the battery temperature TB is continuously below the second threshold temperature TB2 is equal to or longer than the preset threshold period (Step S22).

When the answer is NO in Step S22, the ECU 48 returns the processing to Step S20 to continue to control the engine 22.

When the answer is YES in Step S22, the ECU 48 stops the engine 22 and returns the processing.

The above processing is carried out repeatedly.

Next, operations and effects of the present embodiment will be described with reference to FIGS. 7 to 9.

The following description will be made on the assumption that in a state where normal traveling of the vehicle 10 is performed by using the motor 18 with the engine 22 stopped, the battery temperature TB is increased with the passage of time and then the engine 22 is started in the course of time.

Figure 7:
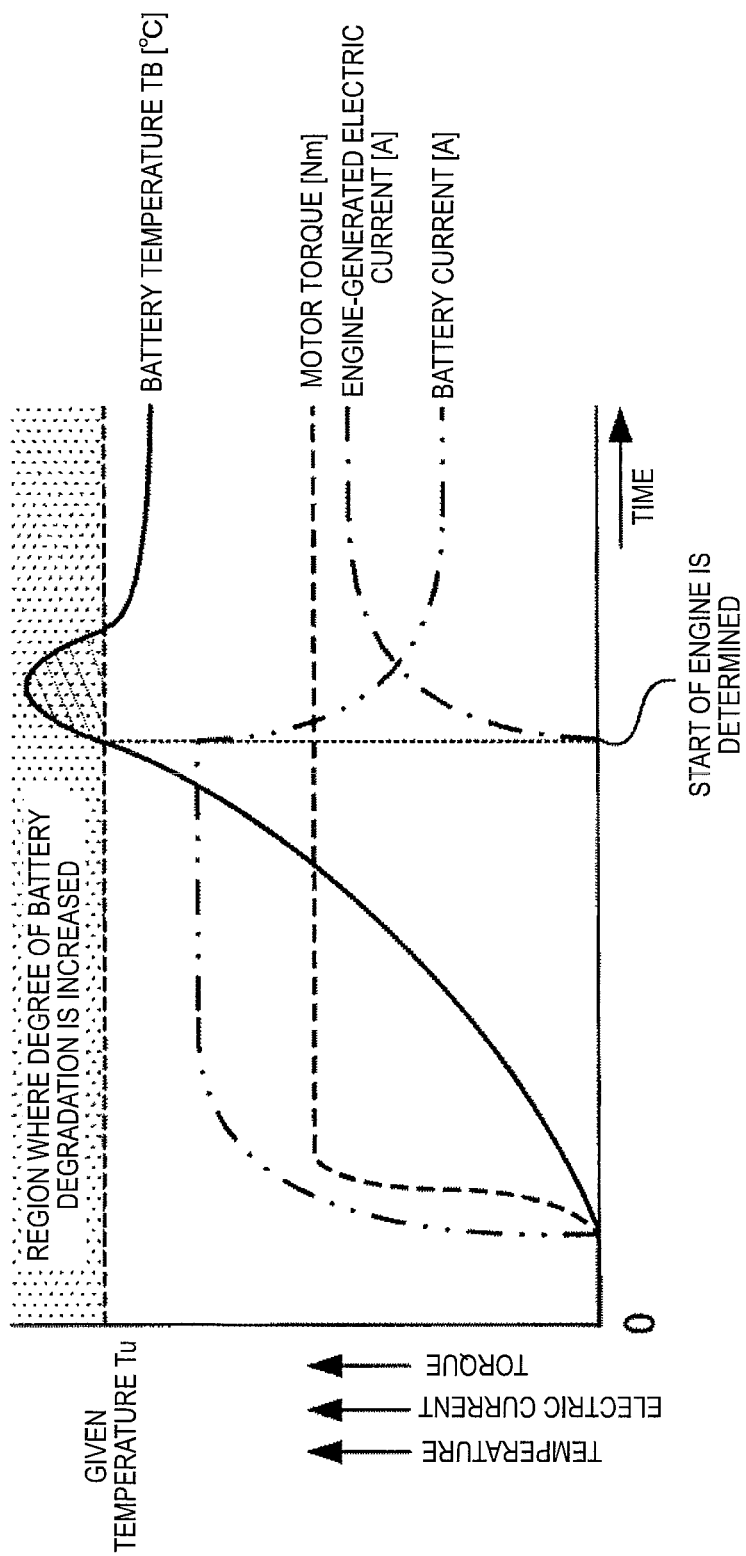
FIG. 7 is an explanatory graph illustrating a comparative example in which an engine 22 is started at the instant when the battery temperature TB reaches a given temperature Tu.
Figure 8:
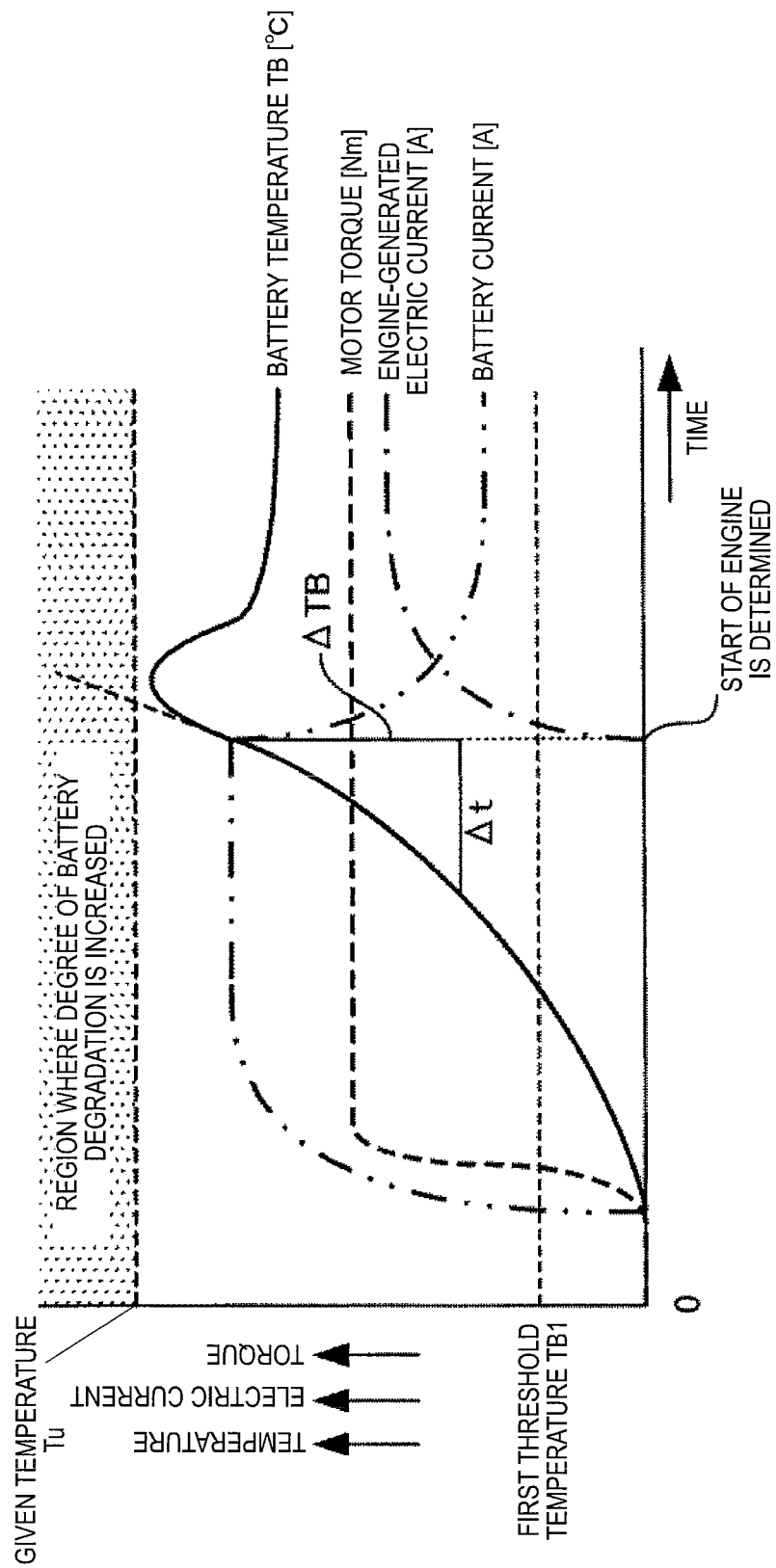
FIG. 8 is an explanatory graph illustrating operations of the controller 30 performed when the temperature increase rate α is low and an amount of increase in the battery temperature TB after engine start is relatively low.
Figure 9:
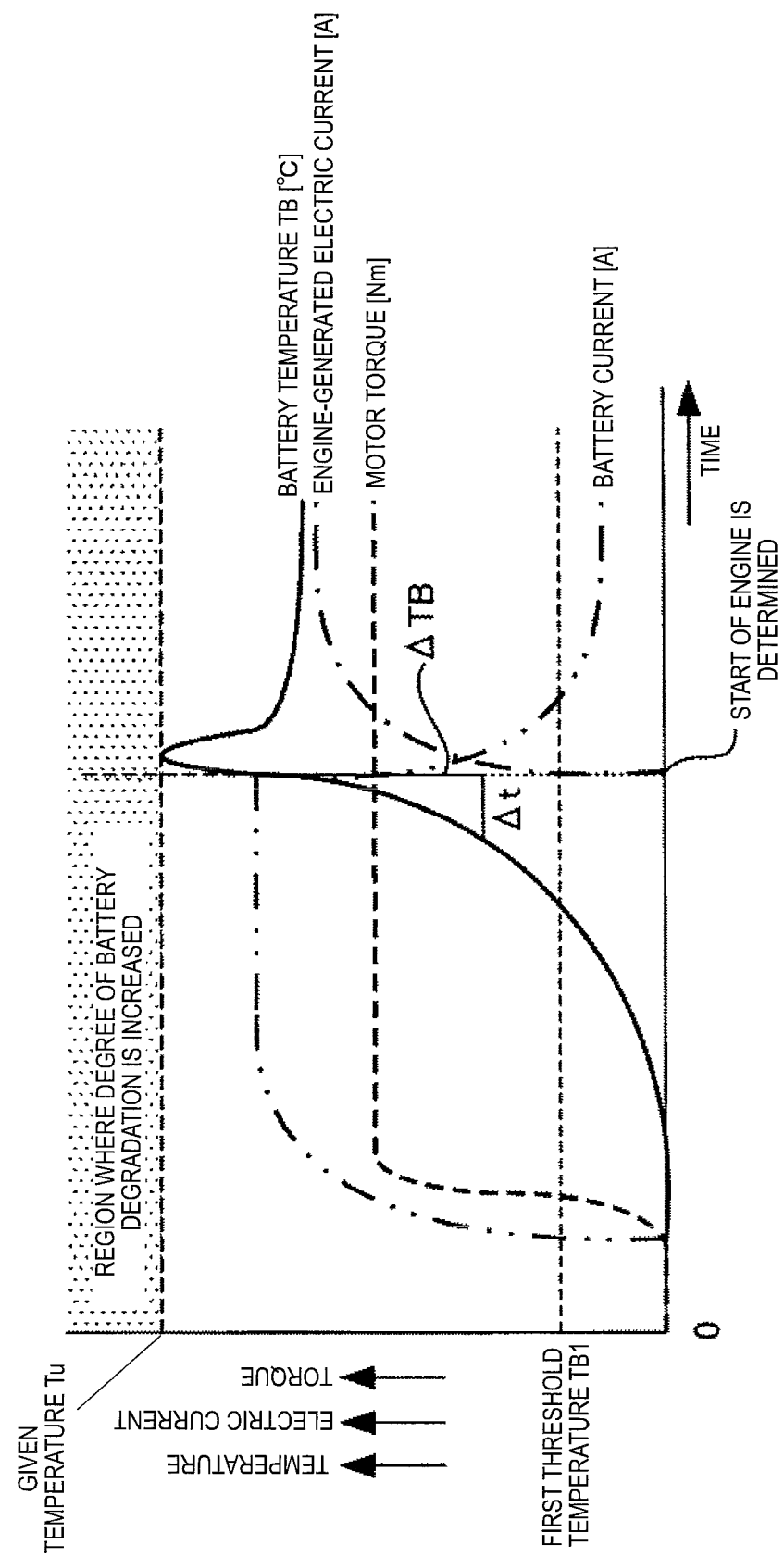
FIG. 9 is an explanatory graph illustrating operations of the controller 30 performed when the temperature increase rate α is high and the amount of increase in the battery temperature TB after engine start is relatively high.

In each of FIGS. 7 to 9, the horizontal axis represents time, and the vertical axis represents the battery temperature TB, battery current, electric current generated by the engine 22, and torque of the motor 18.

In each of FIGS. 7 to 9, the reference character "Tu" signifies a given temperature. When the battery temperature TB is equal to or higher than the given temperature Tu, the degree of degradation of the battery is increased. Accordingly, in order to suppress degradation of the high voltage battery 12, it is important to prevent the battery temperature TB from reaching a hatched battery degradation region where the battery temperature TB is equal to or higher than the given temperature Tu.

First, for the sake of clarity, a comparative example in which the engine 22 is started at the instant when the battery temperature TB reaches the given temperature Tu will be described with reference to FIG. 7.

When normal traveling is performed by using the motor 18, the battery temperature TB will be increased with the passage of time.

In the course of time, when the battery temperature TB reaches the given temperature Tu, the engine 22 is started to activate the generator 24, so that the generator 24 starts to generate electric power and the generated electric current is supplied to the motor 18. As the generated electric current supplied to the motor 18 is increased, the battery current supplied to the motor 18 from the high voltage battery 12 is reduced. In this case, motor torque is kept constant before and after the start of the engine 22.

Due to the reduction in the battery current, the battery temperature TB will be reduced with the passage of time.

However, in this example, there is apprehension that the high voltage battery 12 will be degraded because the battery temperature TB continues to increase for a while even after electric power generation is started by the engine 22 and the battery current is reduced, and the battery temperature TB stays within the hatched region and then drops.

On the other hand, in the present embodiment, the engine 22 is started when the temperature increase rate $\alpha$ is equal to or higher than the engine start determination value $\alpha 1$.

Hence, when the temperature increase rate $\alpha$ is high and the battery temperature TB obviously tends to reach the battery degradation region, the engine 22 is started at an earlier stage, thus making it possible to appropriately prevent the battery temperature TB from reaching the battery degradation region.

On the other hand, when the temperature increase rate $\alpha$ is low and the battery temperature TB slightly tends to reach the battery degradation region, the engine 22 is prevented from being started at an early stage, thus making it possible to appropriately prevent the battery temperature TB from reaching the battery degradation region while suppressing a reduction in fuel efficiency.

Accordingly, the present invention is advantageous in terms of suppressing degradation of the high voltage battery 12, caused by an excessive increase in the battery temperature TB, while suppressing a reduction in fuel efficiency.

Furthermore, in the present embodiment, the higher the battery temperature TB, the lower the engine start determination value $\alpha 1$ will be. In other words, the engine 22 is started such that the higher the battery temperature TB, the lower the engine start determination value $\alpha 1$ will be.

Hence, when the battery temperature TB is high and the battery temperature TB obviously tends to reach the battery degradation region, the engine 22 is started at an earlier stage, thus making it possible to appropriately prevent the battery temperature TB from reaching the battery degradation region.

On the other hand, when the battery temperature TB is low and the battery temperature TB slightly tends to reach the battery degradation region, the engine 22 is prevented from being started at an early stage, thus making it possible to appropriately prevent the battery temperature TB from reaching the battery degradation region while suppressing a reduction in fuel efficiency.

Accordingly, the present invention is further advantageous in terms of suppressing degradation of the high voltage battery 12, caused by an excessive increase in the battery temperature TB, while suppressing a reduction in fuel efficiency.

Moreover, in the present embodiment, as illustrated in FIGS. 8 and 9, the driving of the engine 22 is controlled and the engine-generated electric current is increased so that the higher the temperature increase rate $\alpha$, the larger the electric power generation amount P of the generator 24.

Specifically, FIG. 8 illustrates a case where the temperature increase rate $\alpha$ is low and the amount of increase in the battery temperature TB after engine start is relatively small, and FIG. 9 illustrates a case where the temperature increase rate $\alpha$ is high and the amount of increase in the battery temperature TB after engine start is relatively large.

Accordingly, as illustrated in FIG. 8, when the temperature increase rate $\alpha$ is low, there is no need to ensure such a high engine-generated electric current; hence, it is possible to reduce the battery current while suppressing a reduction in fuel efficiency, and a reduction in the battery temperature TB is promoted, thus appropriately suppressing the amount of increase in the battery temperature TB after engine start.

On the other hand, as illustrated in FIG. 9, when the temperature increase rate $\alpha$ is high, a high engine-generated electric current can be ensured; hence, it is possible to further reduce the battery current and to further promote a reduction in the battery temperature TB, thus appropriately suppressing the amount of increase in the battery temperature TB after engine start.

Consequently, the present invention makes it possible to appropriately suppress the amount of increase in the battery temperature TB after engine start while suppressing a reduction in fuel efficiency, and is thus further advantageous in terms of suppressing degradation of the high voltage battery 12.

Further, in the present embodiment, the start of the engine 22 is allowed when the battery temperature TB is equal to or higher than the first threshold temperature TB1, and the start of the engine 22 is disallowed when the battery temperature TB is below the first threshold temperature TB1.

Accordingly, the present invention can suppress unnecessary start of the engine 22, and is thus further advantageous in terms of suppressing degradation of the high voltage battery 12 while suppressing a reduction in fuel efficiency.

Furthermore, in the present embodiment, the engine 22 is stopped when the period during which the battery temperature TB is continuously below the second threshold temperature TB2 after the start of the engine 22 is equal to or longer than the preset threshold period.

Accordingly, the present invention can appropriately stop the engine 22 in accordance with a reduction in the battery temperature TB, and is thus further advantageous in terms of suppressing a reduction in fuel efficiency.

According to an aspect of the invention, the engine is started when the temperature increase rate is equal to or higher than the threshold value. Hence, when the temperature increase rate is high and the battery temperature obviously tends to reach a high temperature, the engine is started at an earlier stage; on the other hand, when the temperature increase rate is low and the battery temperature slightly tends to reach a high temperature, the engine is prevented from being started at an early stage. Accordingly, the present invention is advantageous in terms of suppressing degradation of the battery, caused by an excessive increase in the battery temperature, while suppressing a reduction in fuel efficiency. Further, the threshold value is set so that the higher the battery temperature, the lower the threshold value will be. Hence, when the battery temperature is high and the battery temperature obviously tends to reach a high temperature, the engine is started at an earlier stage; on the other hand, when the battery temperature is low and the battery temperature slightly tends to reach a battery degradation region, the engine is prevented from being started at an early stage. Consequently, the present invention is further advantageous in terms of suppressing degradation of the high voltage battery, caused by an excessive increase in the battery temperature, while suppressing a reduction in fuel efficiency.

According to an aspect of the invention, the driving of the engine is controlled so that the higher the temperature increase rate, the larger the electric power generation amount of the generator will be. Hence, when the temperature increase rate is low, the battery current is reduced while a reduction in fuel efficiency is suppressed; on the other hand, when the temperature increase rate is high, the battery current is further reduced. Consequently, the present invention makes it possible to appropriately suppress the amount of increase in the battery temperature after engine start while suppressing a reduction in fuel efficiency, and is thus further advantageous in terms of suppressing degradation of the battery.

According to an aspect of the invention, the start of the engine is allowed when the battery temperature is equal to or higher than the first threshold temperature, and the start of the engine is disallowed when the battery temperature is below the first threshold temperature. Consequently, the present invention can suppress unnecessary start of the engine, and is thus further advantageous in terms of suppressing degradation of the battery while suppressing a reduction in fuel efficiency.

According to an aspect of the invention, the engine is stopped when the period during which the battery temperature is continuously below the second threshold temperature after the start of the engine is equal to or longer than the preset threshold period. Consequently, the present invention can appropriately stop the engine in accordance with a reduction in the battery temperature, and is thus further advantageous in terms of suppressing a reduction in fuel efficiency.

What is claimed is:

1. A control apparatus for a hybrid electric vehicle comprising: an electric motor configured to drive a driving wheel of the hybrid electric vehicle; a battery configured to supply an electric current to the electric motor; a generator configured to supply an electric current to the electric motor; and an engine configured to allow the generator to generate electric power, the control apparatus comprising:
   a temperature detector configured to detect a temperature of the battery;
   a temperature increase rate calculator configured to calculate a temperature increase rate based on the detected temperature of the battery, the temperature increase rate that is an amount of increase per unit time in the temperature; and
   an engine controller configured to start the engine and activate the generator when the temperature increase rate is equal to an engine start determination value, so as to generate the electric power, wherein
   the engine controller is configured to set the engine start determining value so that the engine start determination value increases as the detected battery temperature decreases,
   the engine controller controls a rotational speed of the engine so that an electric power generation amount of the generator increases as the calculated temperature increase rate increases,
   the engine controller starts the engine when the detected temperature of the battery is equal to or higher than a preset first temperature, and maintains the engine in a stopped state when the detected temperature of the battery is lower than the preset first temperature, and
   the engine controller identifies the electric power generation amount from the increase rate based on a map illustrating a relationship between the temperature increase rate and an electric generation amount by the generator, and controls the rotational speed of the engine so that the identified electric power generation amount is generated by the generator.

2. The control apparatus according to claim 1, wherein the engine controller stops the engine when a period during which the detected temperature of the battery is continuously lower than a preset second temperature after start of the engine is equal to or longer than a preset period.

* * * * *